United States Patent [19]

Coggins et al.

[11] 4,208,196

[45] Jun. 17, 1980

[54] MEANS FOR CONTROL OF FLUID DISTRIBUTION IN LOW TEMPERATURE SEPARATOR

[75] Inventors: Robert W. Coggins; Edwin H. Staley, both of Tulsa, Okla.

[73] Assignee: Combustion Engineering, Inc., Windsor, Conn.

[21] Appl. No.: 955,819

[22] Filed: Oct. 30, 1978

[51] Int. Cl.² ............................................. B01D 19/00
[52] U.S. Cl. ........................................ 55/174; 55/177; 55/204; 210/512 R
[58] Field of Search ..................................... 55/42–46, 55/52, 57, 171–177, 203, 204; 210/182, 260, 512 R

[56] References Cited

U.S. PATENT DOCUMENTS

| 2,656,896 | 10/1953 | Glasgow | 55/174 |
| 2,711,826 | 6/1955 | De Young et al. | 210/182 |
| 3,217,469 | 11/1965 | Eckert | 55/204 |

Primary Examiner—Charles N. Hart
Assistant Examiner—Richard W. Burks
Attorney, Agent, or Firm—Arthur L. Wade

[57] ABSTRACT

The shell of a low temperature separator vessel has an inlet spinner structure mounted to absorb kinetic energy of fluids flowed into the vessel. A grating structure is placed over the outlet of the spinner to dissipate kinetic energy of the incoming fluids, divert the direction of fluid flow away from the gas outlet of the vessel, and distribute the fluids transverse their flow path from the vessel inlet to the vessel outlet.

5 Claims, 3 Drawing Figures

MEANS FOR CONTROL OF FLUID DISTRIBUTION IN LOW TEMPERATURE SEPARATOR

BACKGROUND OF THE INVENTION

1. Field of the Invention

The present invention relates to the absorption of kinetic energy of fluids produced from an oil well into one end of a horizontal separator vessel to distribute the fluids in a plane transverse the vessel axis. More specifically, the invention relates to reducing the kinetic energy of, and distributing, the oil well fluids produced into one end of a horizontal separator vessel so the gaseous portion of the fluids will move uniformly down the flow path provided in the upper part of the vessel to the gaseous outlet of the vessel with efficient separation of liquids from the gaseous portion of the fluids.

2. Description of the Prior Art

Separation of fluids produced from oil wells is now an ancient and honorable art in the oil fields. Basically, the gaseous portion of oil well production must be separated from liquids and the liquids must be separated into their water and oil phases. The principles applied to bring about this separation have the deceptive appearance of simplicity. However, the massive quantity of fluids involved in well production give rise to the tremendous economic importance in the application of these principles. Low temperature separation made its debut on the production scene many years ago. The high pressure in the order of thousands of pounds per square inch at which some production reached the surface has spelled out a source of energy often shamelessly wasted but sometimes partially exploited to advantage. Reducing this pressure with proper regulation results in at least the cooling effect of adiabatic expansion.

The formation of hydrates in predominately gaseous well streams which have been reduced in pressure has facilitated the removal of liquifiable water and hydrocarbon from more volatile portions of their well streams. Under this principle, a low temperature separator had its birth in the oil fields.

A degree of controversy has always revolved around the choice between a horizontally extended vessel and a vertically extended vessel. In general, the need for a bath of relatively warm liquid into which the hydrates could be gravitated has favored the horizontal form. No manufacturer of oil field equipment has even closely rivaled the exploits of the National Tank Company of Tulsa, Okla., in providing an acceptable form of low temperature separator to the oil field producer.

With the general decline of native high pressure in the oil fields, the low temperature separator may be said to be entering upon its autumn years. However, future techniques of exploration may put the lie to these discouraging opinions. Whatever future there is to the low temperature separator, it will continue to be written in the engineering potential of Combustion Engineering, Inc. of Windsor, Conn., which purchased the assets of National Tank Company some years ago.

Many and varied are the problems of construction and operation of the low temperature separator solved by the engineers of the old National Tank Company. The outline of these problems, and their solutions, may be traced, to a large extent, through the patent activity of the National Tank Company inventors. These issued patents form the core of the patent literature in this art.

The following list gives a rather comprehensive view of this literature which has been reviewed for its disclosure relating to the energy absorption structure within the separator for the fluids drastically reduced in pressure from their wells.

| NUMBER | FILING DATE | INVENTOR |
|---|---|---|
| 2,711,826 | AUGUST 30, 1951 | C. E. DEYOUNG ET AL |
| 2,747,002 | OCTOBER 24, 1952 | J. P. WALKER ET AL |
| 2,728,406 | SEPTEMBER 25, 1953 | J. L. MAHER |
| 2,738,026 | NOVEMBER 2, 1953 | C. O. GLASGOW ET AL |
| 2,758,665 | DECEMBER 20, 1954 | A. W. FRANCIS, JR. |
| 2,809,713 | JULY 9, 1956 | R. W. COGGINS |
| 2,873,814 | APRIL 22, 1957 | J. L. MAHER |
| RE. 25,759 | JULY 25, 1958 | J. P. WALKER ET AL |

A study of these patent disclosures demonstrates that little attention has been given the spinner into which the incoming fluids have been directed. Essentially, the spinner is no more than a ring, the incoming fluids being flowed tangentially around the internal surface of the ring. In broad principle, this form of structure for diversion of flow streams has long been a feature of the separator art, not limited to the low temperature separator. The only structure mounted on the spinner has been some form of heating device. Localized heating of the spinner is practiced to avoid build-up of hydrates formed by the pressure reduction of the well stream impinging upon the inner surface of the spinner.

Discharge of the diverted fluids of the spinner structure has simply been the result of gravity pulling the fluids downward toward the lower liquid bath carried in the lower portion of the horizontal separator vessel. No concern has been given in the past to the distribution of these fluids after their pressure has been reduced and they have been diverted by the spinner. It has always been simply expected that the hydrates formed would find their way into the relatively warm liquid bath below and the separated gaseous portion would exit the vessel from an upper outlet provided downstream from the vessel inlet. The problems of providing proper valving to reduce pressure of the fluids, heating the liquid bath, isolating the upstream cool portion of the vessel from the downstream liquid discharge compartments and arrangements for separating the oil from the water have challenged the creative ingenuity of the engineers charged with the responsibilities of providing a workable product to the industry. Some concern has been given to the amount of liquid carryover actually appearing at the gas outlet of the vessel. Lately, this concern has resulted in measurements of this carryover which have rung the alarm bell in the Tulsa office of the C-E Natco Division of Combustion Engineering, Inc. The first observations brought to light the problem that the fluid stream emerging from the spinners was all too often directed down into the liquid bath below to reentrain liquids in the gaseous portions which reach the gas outlet of the low temperature separator. Further, the distribution of the gaseous fluids was apparently so inconsistent across the upper portion of the horizontal vessel that the hydrating liquids reached the gas outlet of the vessel before they could be disengaged into the liquid bath in the lower portion of the vessel. Order must be brought out of this chaos to reduce the carryover of liquid at the gaseous outlet of the vessel.

SUMMARY OF THE INVENTION

The present invention contemplates structure mounted across the exit of a low temperature separator inlet spinner to absorb kinetic energy of fluids discharged from the spinner.

The invention further contemplates a series of parallel strips, or slats, extending across the discharge of a spinner to provide a series of impact surfaces upon which the spun fluids from the spinner dissipate their kinetic energy.

The invention further contemplates a second series of parallel strips, or slats, extended transverse the first series of parallel slats to form a grill, or grating, which distributes the fluids discharging from the spinner over a plane transverse the horizontal axis of the vessel in which the spinner is mounted.

The invention further contemplates that the first series of parallel strips, or slats, are arranged parallel to the axis of the horizontal vessel with the downstream ends of the slats joined by a slat structure which blocks exit of the fluids toward the downstream gaseous outlet of the vessel.

The invention further contemplates the circular spinner opening provided with a circular grating of parallel slats, or strips, with a central opening large enough to obviate obstruction by hydrate accumulation from the fluids spun by and discharged from the spinner structure.

DESCRIPTION OF THE PREFERRED EMBODIMENT OF THE INVENTION

Prologue

The problem of the low temperature separator (LTX) described in the prior art section of this application has festered beneath the surface of design and operation of these units for many years. It took a specific installation in Nigeria, Africa, to precipitate conception of the present invention and create the opportunity to reduce it to practice. In Warri, Nigeria, unacceptably high dew points were reported in the gas outlet of LTX separators installed at Ughelli II for Shell-British Petroleum. The present inventors headed up a team dispatched by the assignee to the scene of the action to solve the problem.

The high dew point of the gas delivered to N.E.P.A. at Ughelli was analyzed as a result of two separate problems. First, there appeared to be inadequate equalization between the upstream (cold) and the downstream (warm) portions of the separator. There was an abnormal buildup of liquids on the cold portion, which resulted in a liquid carryover into the gas outlet. Second, a "turbulent" condition in the gas section of the separator was charged with mechanical entrainment of liquids by the gaseous portion of the fluids with subsequent appearance of these liquids in the outlet for the gas.

The first problem was met by adjusting the height of the baffles between the cold and the warm portions.

After the baffle modifications, the separator was tested at 32 MMSCFPD throughput. The result was a dramatic reduction in both hydrocarbon and water dew points in the gas outlet of the separator. Specifically, the hydrocarbon dew point tested at below 30° F. and water dew point below the definable limit of the test equipment.

Although the baffle modification gave a significant improvement in the LTX operation, we as the inventors were not satisfied that the improvement was sufficient. The turbulent conditions existing at the spinner outlet should be reduced. Prior to leaving for the test site, we had extensively model-tested various structural arrangements to reduce spinner output turbulence. The most promising of the tested structures embodied the present invention and we were itching to reduce it to practice on this test site.

Briefly, the embodying structure was mounted beneath the outlet of the spinner within the LTX unit. The unit was then tested at a throughput range from 17 to 60 MMSCFPD. Inlet flowing pressures were at 2800 psi. Hydrocarbon dew point was measured at approximately 34° to 38° F.

One of the unfortunate developments in the test conditions was loss of control of the temperature of the liquid bath. Consequently, the temperature of the liquid bath was carried at a conservatively higher temperature than the minimum necessary to control hydrates. However, the results were logically extrapolated to evidence a satisfactory additional control of the outlet gas dew points. The invention was proven to be an outstanding success with this actual reduction to practice.

FIG. 1

Figure 1:
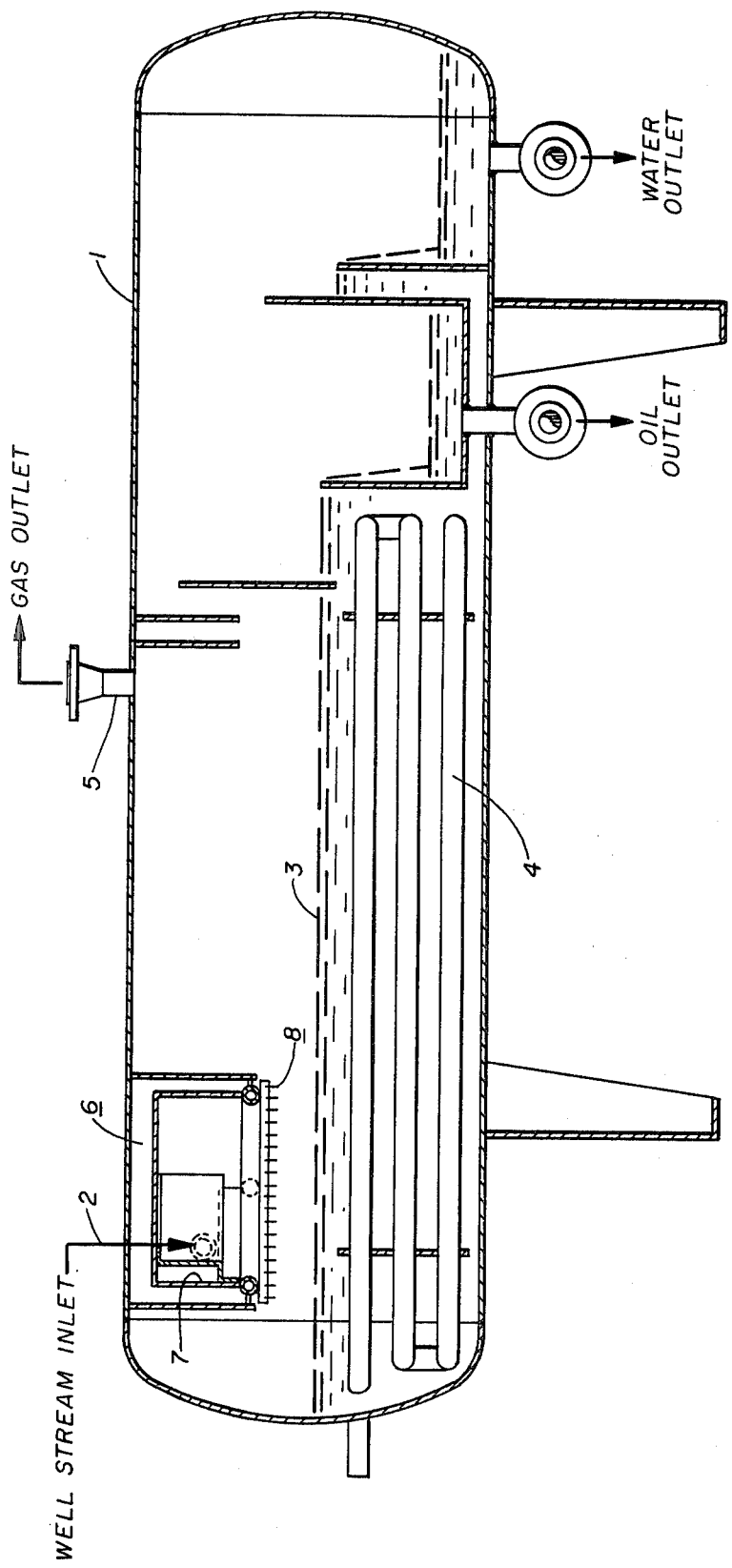
FIG. 1 is a sectioned elevation of a horizontal form of a cylindrical low temperature separator shell with a spinner at the inlet of the separator vessel, including a distributor structure in which the present invention is embodied.

Referring specifically to the structure disclosed in FIG. 1, the horizontally, extended cylindrical shell 1 of a low temperature separator is sectioned for analysis. No purpose will be served in stating a long list of structures and functions of the LTX as it operates under the teachings of the prior art. The patent disclosures listed earlier in this application adequately describe the conventional features.

Briefly, inlet conduit 2 introduces a predominantly gaseous well stream into one end of shell 1. Hydrates formed from the hydrocarbon and water entrained within the gaseous components of the stream are expected to gravitate into liquid bath 3 formed in the lower portion of horizontal shell 1. Liquid bath 3 is heated by exchange with a coil 4. The heating medium circulated through coil 4, and the arrangement for heating the medium, is not shown.

Gravitation of the hydrates from the gaseous medium is expected to dehydrate the gaseous medium so that it will flow from the inlet conduit 2 out of the gaseous conduit 5 with a dew point of both hydrocarbons and water low enough to meet specifications by the receiver.

The liquids accumulated in bath 3 are separated in the downstream end of shell 1 and removed through conduits properly controlled to complete the liquid separation.

Among the many variables related to the flow of fluids through shell 1, the present invention is concerned with reducing the turbulence caused by the discharge of the produced fluids into the upstream end of shell 1.

The turbulence of the fluid in the upstream end of shell 1 is sustained by the prior art form of discharge of the fluids from spinner 6. The incoming well fluids are brought into shell 1 and released in a direction tangential to the inside wall 7 of spinner 6. The result is to spin fluids on the circumferential wall 7. This deflection of the well stream by the wall 7 absorbs kinetic energy from the fluids and hopefully the fluids will discharge downwardly toward bath 3 without turbulence. Unfortunately, this is a vain hope. In many applications, a gaseous well stream spinning out of structure 6 retains large components of force directed into the liquids of bath 3 so that the liquids of the bath are entrained and turbulently flowed out of shell 1 by way of gaseous conduit 5. Admittedly, the distance between spinner 6 and outlet conduit 5 is often not great enough to provide time for the liquids entrained by the gaseous portions of the fluids to disengage. The result is an elevation of the dew point of the gas discharged through conduit 5 which evidences loss of the liquids downstream. The present invention is expected to greatly reduce, if not obviate, this loss.

Never before has there been a diverting, flow-modifying, structure mounted at the exit of an LTX spinner. Now that measurement of dew points has become more frequent, sophisticated and accurate, it is also necessary to insure higher extraction of kinetic energy of the fluids entering the shell 1 and distribution of the fluids transverse the longitudinal axis of shell 1. With kinetic energy levels properly lowered and distribution over the plane perpendicular to the axis of shell 1, the disengagement of liquifiable components of the stream becomes so efficient that the dew points of the gas discharged from conduit 5 are kept to a satisfactory low level.

The structure in which the invention is embodied is mounted beneath the outlet of spinner 6. The structure, in its preferred form, is disclosed at 8 and needs to be visualized in FIG. 1, as an impact structure upon whose surfaces the fluid stream dissipates kinetic energy.

The impact structure 8 is shaped and arranged to obviate the immediate projection of the fluids from spinner 6 toward gaseous conduit 5. The fluids are "blocked" from flowing immediately toward the down-vessel end of shell 1. This blocking action begins their distribution over a plane extending transverse the flow path of the fluids terminating at gaseous conduit 5.

Figure 2:
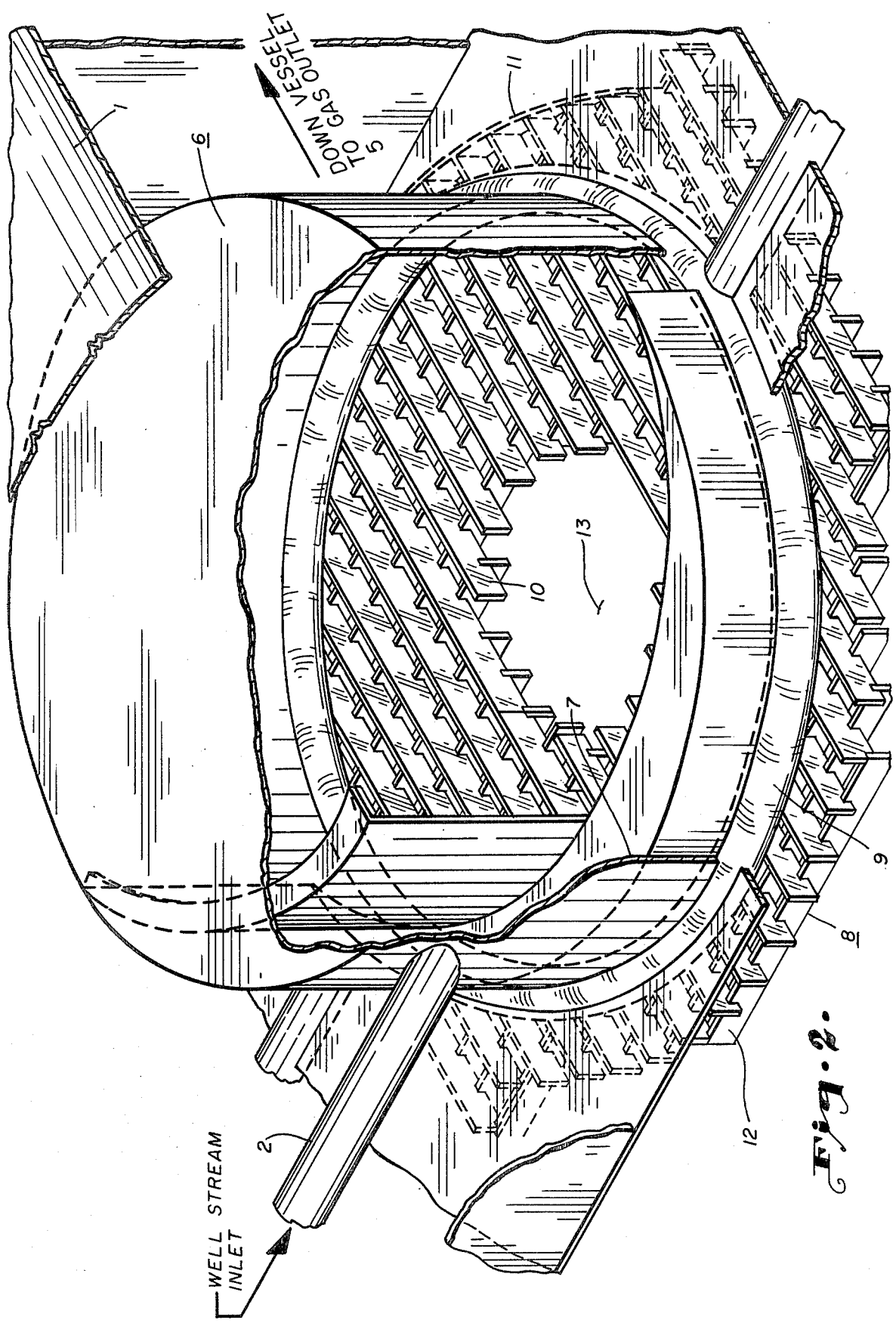
FIG. 2 is a perspective view of the spinner of FIG. 1 disclosing further details of both the spinner and the grid structure mounted below it.
Figure 3:
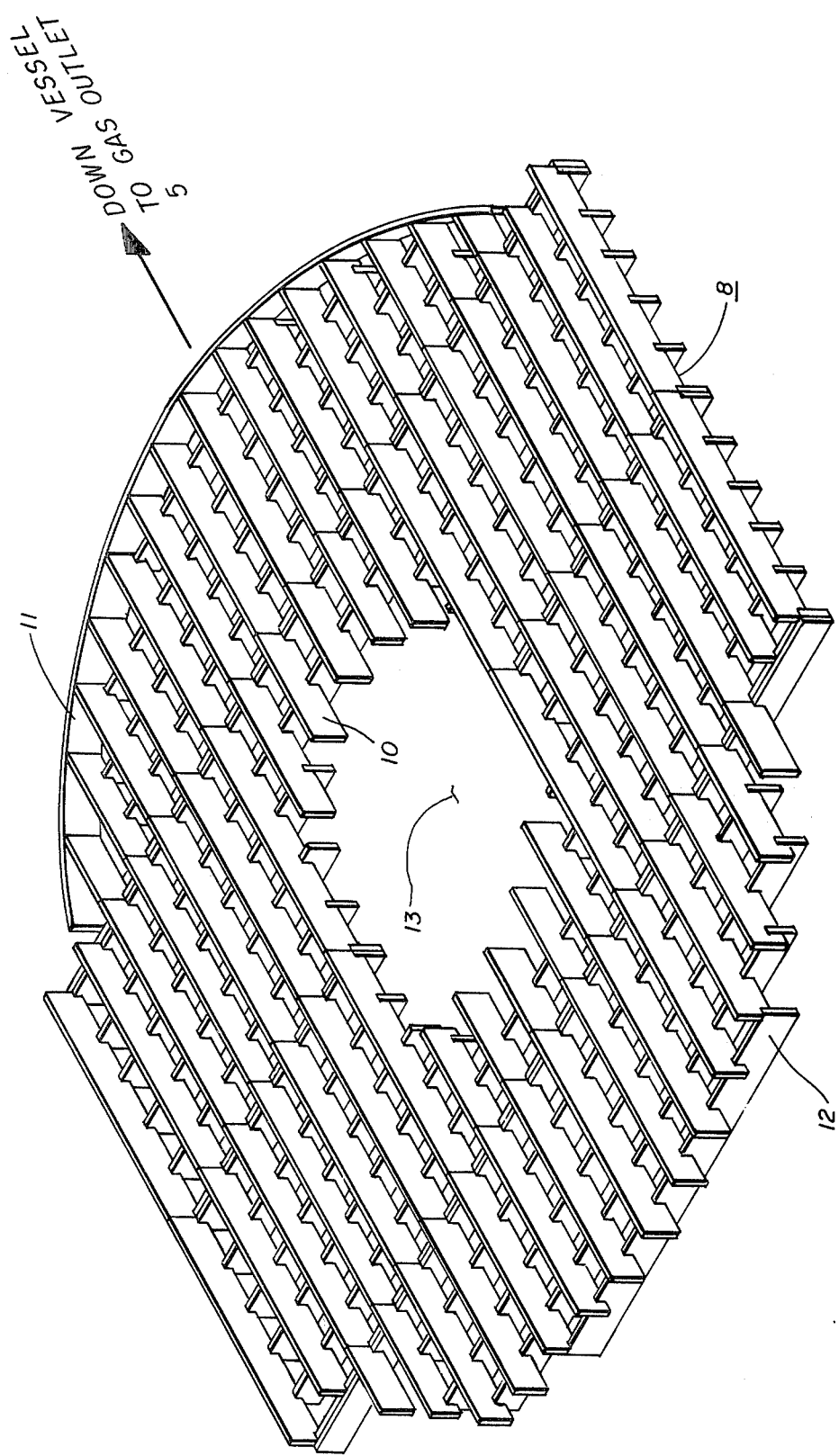
FIG. 3 is a perspective view of the grid alone, disclosing the grid components in greater detail and the center aperture through the grid.

The form and arrangement of impact structure 8 will be more thoroughly disclosed in FIGS. 2 and 3. The subsequent disclosure will have a two-layer configuration of parallel slats. An aperture is provided in the center of the circular configuration of this impact structure to insure the uninterrupted flow of fluids into the shell 1, although exits through the structure, and about the central aperture, may become physically clogged with hydrates formed from the liquifiable components of the well stream.

FIG. 2

FIG. 2 discloses spinner 6 oriented as it is mounted within the shell 1. The view is in perspective to disclose the structure to better advantage. The general configuration of spinner 6 can be seen as basically a simple cylinder with an inside wall 7. The predominantly gaseous well stream is directed, by conduit 2, to flow tangentially upon the circumferential inside wall 7 and spiral downwardly to exit from the lower end of the spinner 6. In passing down through the lower outlet of spinner 6, the well stream impacts upon structure 8 mounted below the spinner outlet.

Of course the hydrates forming in the predominantly gaseous well stream would contact, and adhere to, the wall 7 if the wall 7 were sufficiently cooled. To obviate collecting hydrates on surface 7, a heating means is provided for wall 7. This heating means is disclosed in a simple form of a pipe 9 attached to the lower edge of wall 7. It is simply a matter of plumbing to supply suitable heating fluid to pipe 9 in order to elevate the temperature of wall 7 attached to pipe 9.

Continuing with the principle disclosure related to spinner 6, impact structure 8 can now be disclosed as comprised of a first set of parallel slats, fins, strips 10. Each of these parallel structures 10 extends across the lower spinner opening. Structures 10 are relatively thin, having a width in the order of 1 inch and a length necessary to extend across the lower opening of spinner 6. Parallel as they are, structures 10 are oriented to the direction of discharge of the spiraling fluids from wall 7, which will bring about impact of these fluids on one of the faces of each of the structures 10.

As a practical matter, the incoming fluids are introduced on to wall 7 at the point which will cause them to travel around the surface of wall 7 until they reach the lower edge of wall 7 at a point substantially opposite the impact faces of metal slats 10. Of course, there are many variable factors of flow rate and fluid quantity and distribution on wall 7 of the downwardly spiraling fluids which make the end result somewhat less than ideal. Therefore, the description includes the term "substantially" when describing the course of the fluids and their discharge direction relative to the vertical impact faces of the slats 10.

The basic result of impacting the discharging fluids to impact the slat surfaces at substantially a right angle is to absorb large quantities of the kinetic energy of these fluids. Not only is their kinetic energy absorbed to a large extent but the stream is physically divided, broken up, and distributed in a plane transverse the axis of the vessel in which spinner 6 is mounted.

In the tumulteous, chaotic, multi-directional discharge of fluids downwardly through slats 10, some portion of the fluids will be given a component of force in a direction toward the down-vessel gas outlet 5. The percentage of the well stream thus forced toward gas outlet 5 will tend to carry entrained hydrates along the flow path and out conduit 5.

That portion of the fluids forced toward the gas outlet is blocked by a structure at the down-vessel end of the parallel slats 10. This blocking structure is embodied in a slat 11 joining the down-vessel ends of slats 10. Blocked in the direction of a down-vessel flow path, the fluids are forced in an up-vessel direction from which they are generally distributed across the upper vessel portion above the liquid bath 3. All of the flow stream from spinner 6 distributed across the vessel space above the liquid bath is then expected to flow more or less uniformly toward gas outlet 5, giving adequate time for the hydrates to disengage and gravitate into the lower liquid bath 3.

In addition to the blocking function of slat 11, a second series of parallel slats 12 are mounted below slats 10 to extend in a direction at right angles to slats 10. Therefore, slats 10 and slats 12 form a grid through whose resultant apertures the fluids discharged downwardly from spinner 6 are well controlled by further absorption of kinetic energy and distribution across the vessel space. The final result of the disclosed arrangement is impact structure 8 comprised of a layer of vertical slats 10, blocking slat 11, and a lower layer of slats 12. As a unit, the structure 8 is mounted directly below the spinner 6 to receive the fluid spun from wall 7, absorb kinetic energy and distribute the fluids over a plane transverse the axis of shell 1. Thus is provided a calming, technological hand on the fluids introduced into shell 1, resulting in high efficiency in the disengagement of the hydrates and consequent insurance of low dew points in the gas discharged from conduit 5.

FIG. 3

For further disclosure of the impact structure 8, FIG. 3 is established to show the structure separate from spinner 6. Again, the drawing convention of perspective is used. With the spinner 6, in effect, removed the grid structure can be seen the more clearly as comprised of a first layer of slats 10 and a second lower layer of slats 12. Upper parallel slats 10 are arranged parallel to the axis of shell 1 and at right angles to parallel slats 12. The two layers are sandwiched together to form the basic distributing grid 8 in which the invention is embodied. The attachment of this grid across the opening of spinner 6 is an incidental feature relative to the invention. There are many choices of attachment.

Next in importance is blocking slat 11 which is arranged along the down-vessel side of the first layer. As previously indicated, this slat 11 is thus positioned to function as a wall of which spun fluids are bounced back toward the upstream end of shell 1. The three basic components of the grid structure 8 function to absorb kinetic energy of the spun fluids and distribute, or dissipate, the fluids across the vapor space of shell 1 above bath 3.

The proof of the pudding is in the eating. With this structure in place, as an actual reduction to practice, the hydrocarbon and water dew points in the discharge of the LTX are controlled to a desired low value. Other configurations of the actual reduction to practice were adjusted to influence the dew points. However, with the introduction of the present embodiment of the invention, we have unmistakably made a giant step in reducing the dew points.

The highlighted feature of FIG. 3 is the disclosure of the central opening 13 through the grid. Of course, the spacing of the slats from each other will fix the size of their openings through the grid. Some experimentation will be required to adjust the size of these openings to avoid unnecessary pressure drop in obtaining the distribution required. Obviously, the smaller the openings, the more easily hydrates will bridge and plug the openings. It is readily understood in the art that this plugging could seriously increase the pressure drop across the grid and even completely block fluid discharge from the spinner. Therefore, opening 13 is provided as a safety valve. The opening 13 is made large enough to insure against plugging by hydrates without being so large as to reduce the effectiveness of the structure 8 as a distributor.

CONCLUSIONS

Improvements in the low temperature separator have been hard to come by in recent years. The market for the separator has been threatened by the progressive decline of native pressure in predominantly gaseous production. At times, it has appeared that the technological zenith has been formed by declining numbers of applications as well as lack of fundamental research and development.

It is interesting, therefore, to observe that specific problems of detected high hydrocarbon and water dew points force a unique solution out into the open. Spurred by the demands of a specific customer, at a specific location, the present inventors proved to have the resourcefulness to pull out the solution necessary. Feverish laboratory activity was a prelude to on-site modification of separators which had to meet customers' specifications. Objectively, midwifing inventions into being under these conditions was awkward. Nevertheless, our present inventors recognized that among the options open to reducing hydrocarbon and water dew points in the output gas, reduction of kinetic energy and distribution were required. The result was the structure disclosed in the present application which met the emergency in Africa.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A system for absorbing flowing energy of a fluid stream for a low temperature separator, including,
    a cylindrical shell extended horizontally,
    an inlet conduit through the wall of one end of the shell,
    a spinner of circumferential form mounted at and within the inlet end of the shell and arranged to receive incoming fluids from the inlet on the internal wall of the spinner and discharge all of the fluids downwardly through an exit opening of the spinner,
    a plurality of parallel slats mounted at the exit opening of the spinner, the parallel slats arranged and positioned to extend across the exit opening of the spinner so that their sides form impact surfaces for all of the fluids discharged from the spinner outlet,
    and an outlet conduit through the wall of the shell a predetermined distance from the inlet end of the shell for the gaseous portion of the fluids entering the shell.

2. The system of claim 1 in which,
    the spinner structure is mounted within the shell to orient its axis at a right angle to the axis of the shell,
    and the parallel slats are extended across the lower outlet of the spinner and parallel the shell axis.

3. The system of claim 2 including,
    fluid flow blocking structure which extends between the downstream ends of the parallel slats to obviate immediate discharge of the fluids downstream within the vessel.

4. The system of claim 3 including, a second set of parallel slats mounted below the first parallel slats and extending at right angles to the first parallel slats to form a complete fluid energy absorbing unit at the spinner outlet which absorbs kinetic energy from the incoming fluids and facilitates distribution of the fluids over a plane transverse the elongated horizontal shell.

5. The system of claim 4, including,
an aperture through the center of the grid formed by the first and second sets of parallel slats to provide outlet passage for the inlet fluids should the other grid openings become clogged by hydrate accumulation.

* * * * *